Nov. 6, 1962 R. R. MONTPEAT 3,061,879
APPARATUS FOR PRODUCING MANY-COLOURED ARTIFICIAL
FLOWERS OF THERMOPLASTIC MATERIAL
Filed April 11, 1960 2 Sheets-Sheet 1

Nov. 6, 1962 R. R. MONTPEAT 3,061,879
APPARATUS FOR PRODUCING MANY-COLOURED ARTIFICIAL
FLOWERS OF THERMOPLASTIC MATERIAL
Filed April 11, 1960 2 Sheets-Sheet 2
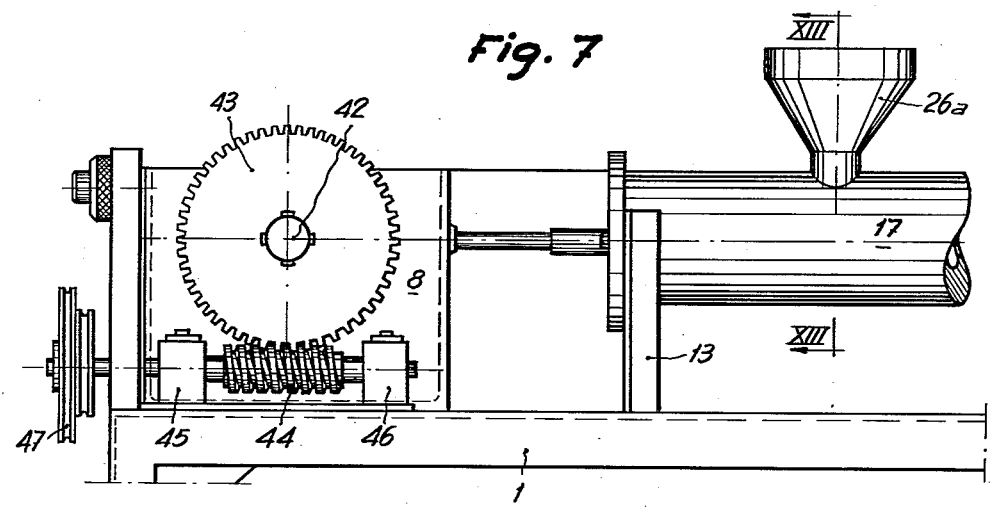
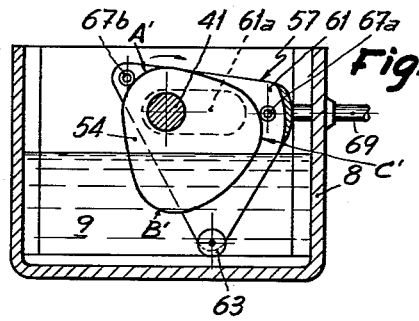
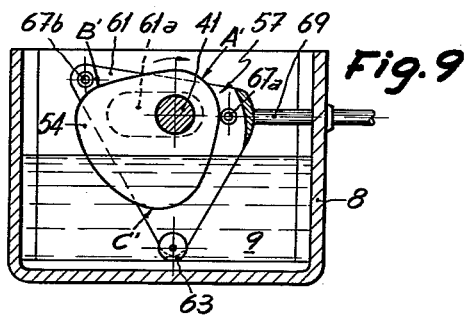
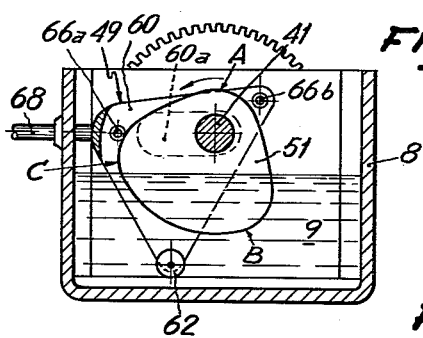
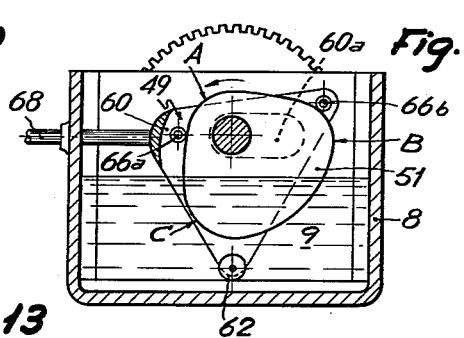
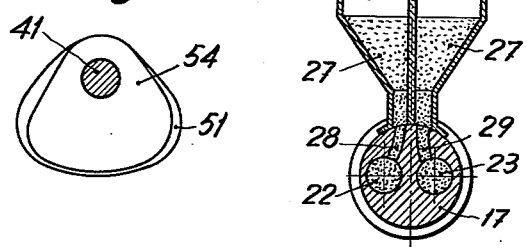

United States Patent Office 3,061,879
Patented Nov. 6, 1962

3,061,879
APPARATUS FOR PRODUCING MANY-COLOURED ARTIFICIAL FLOWERS OF THERMOPLASTIC MATERIAL
Ramón Rocafort Montpeat, Avenida General Mitre 140, Barcelona, Spain
Filed Apr. 11, 1960, Ser. No. 21,204
Claims priority, application Spain Apr. 18, 1959
3 Claims. (Cl. 18—30)

The present invention relates to the manufacture of many-coloured, and preferably two-coloured, artificial flowers of thermoplastic material. Polyethylene and polyvinyl chloride are examples of thermoplastic materials which are suitable for this purpose.

The petals of most artificial flowers are radially disposed around a central button or ring. It is often desirable that the petals of the flowers be of different colours, mostly of two colours, as in the actual flowers which are being imitated. The colours are usually distributed in such a way that the zone adjacent the base of the petals is of one colour and the zone adjacent the ends thereof is of another colour. There is very often an intermediary zone in which the two colours mix in a usually sinuous or zigzag line.

In order to obtain such many-coloured pieces, it has been the practice in the art to paint a piece which has been moulded in one of the desired colours. This method has many disadvantages: it requires a second operation on each moulded piece; the coat of paint does not adhere perfectly to the plastic and it comes off relatively easily; the flowers must be set to dry.

It is an object of the present invention to provide an apparatus for manufacturing many-coloured flowers which satisfies the abovementioned requirements.

Another object of the invention is to provide an apparatus for injecting plastic material of two colours into a mould without mixing the two colours.

The process of the invention in general comprises separately fluidizing thermoplastic materials melting at the same temperature and having different colours, injecting the fluidized thermoplastic material into a mould through the same nozzle in different steps, in each step plastic of a different colour being injected, the injecting action of fluidized plastic material of each colour starting before the injecting action of fluidized plastic material of a different colour ends, so that no interruption of flow of fluidized plastic material occurs in the nozzle from the beginning of the first injecting action until the end of the last injecting action, a period of simultaneous injection occurring between the separate injection of fluidized plastic material of two different colours.

The invention includes an apparatus for performing the steps in proper relationship, substantially as hereinafter disclosed and claimed.

With reference to the attached drawings:

FIG. 7 shows a partial side view of the apparatus of FIG. 1.

FIG. 8 shows a cross-section view of the apparatus along line VIII—VIII of FIG. 1 in the extreme forward position of the injecting piston.

FIG. 9 is a view similar to that of FIG. 8 in the extreme backward position of the injecting piston.

FIG. 10 shows a cross-section view of the apparatus along line X—X of FIG. 1 in the extreme forward position of the injecting piston.

FIG. 11 is a view similar to that of FIG. 10 in the extreme backward position of the injecting piston.

FIG. 12 shows a section along line XII—XII of FIG. 1.

FIG. 13 shows a section of the injecting means along line XIII—XIII of FIG. 7.

Figure 1:
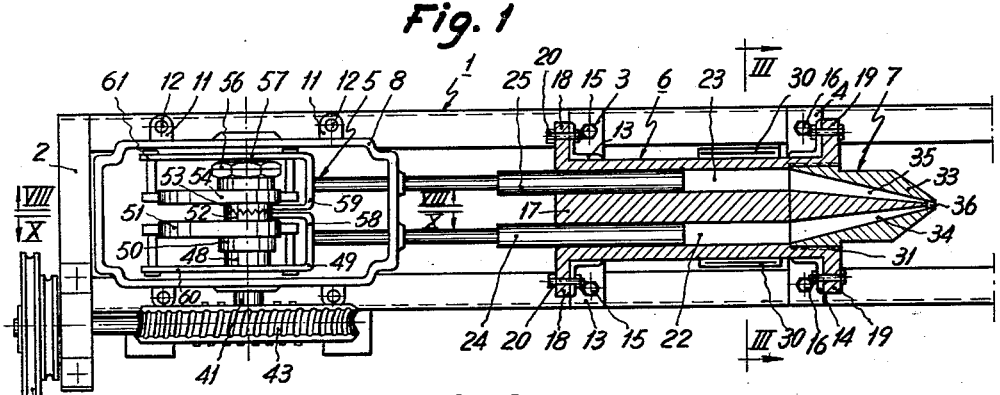
FIG. 1 is a top view of the apparatus according to the invention, partially in section, showing two injecting cylinders and pistons in non-working parallel position.
Figure 2:
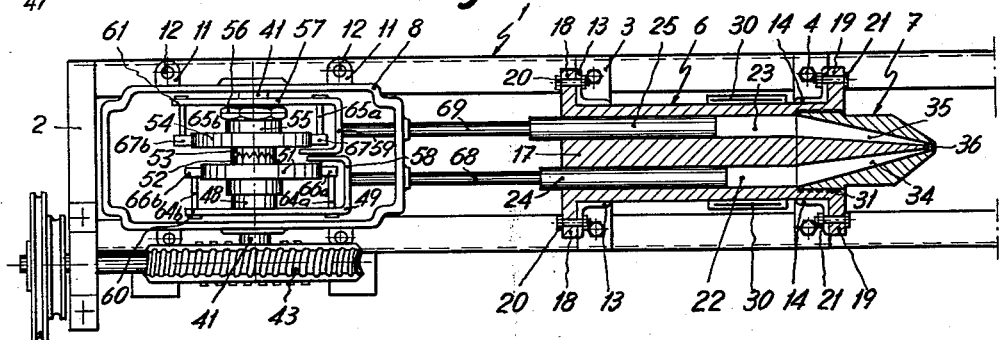
FIG. 2 is a view similar to that of FIG. 1, in which the two pistons are in an outphased position.
Figure 3:
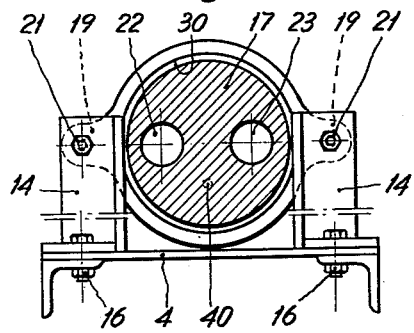
FIG. 3 shows a section along line III—III of FIG. 1.
Figure 4:
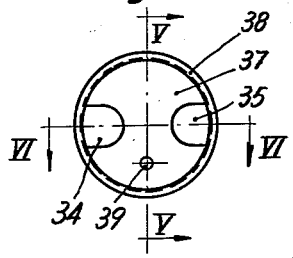
FIG. 4 is a view of the nozzle showing the surface in contact with the injecting cylinders.
Figure 5:
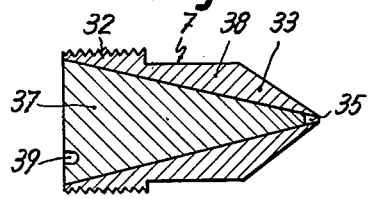
FIG. 5 is a section along line V—V of FIG. 4.

The apparatus is mounted on a frame 1 having transverse bars 2, 3 and 4, and comprises a driving mechanism 5, an injecting mechanism 6 and a nozzle 7 (FIGS. 1 and 2).

The driving mechanism 5 is set within a box 8 filled with lubricating oil 9 to a certain level. The box 8 is fixed by flanges 11 to the frame 1 by means of screws 12.

The injecting mechanism 6 is supported by L-bars 13 and 14 bearing respectively on transverse bars 3 and 4. Nut and bolt assemblies 15 and 16 fix L-bars 13 and 14 to transverse bars 3 and 4. The injecting mechanism 6 has a body 17 provided with flanges 18 and 19 through which it is fixed to L-bars 13 and 14 by means of nut and bolt assemblies 20 and 21. The body 17 has two inner parallel cylinders 22 and 23 along which can travel two injecting pistons 24 and 25. A twin-hopper 26a—26b (FIG. 13) can deliver granulated plastic material 27 to cylinders 22 and 23 through ducts 28 and 29 open in the body 17. The granulated plastic material is thus supplied to the cylinders 22 and 23 just in front of injecting pistons 24 and 25 in the position shown in FIG. 1. Heating means comprising an electrical resistance 30 surround the front part of body 17, and can cause the fluidization of granular plastic material 27. The heating means is controlled by a thermostat (not shown). Cylinders 22 and 23 are connected to a front chamber having a threaded wall 31.

Figure 6:
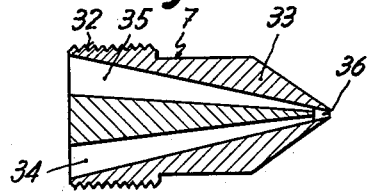
FIG. 6 is a section along line VI—VI of FIG. 4.

The nozzle 7 has a back threaded zone 32 which can be screwed to the threaded wall 31 of body 17 and a front tapered end 33 which is connected to the corresponding mould (not shown). The nozzle 7 has two inner converging passages 34 and 35 opening into front chamber 36. The said ducts have a section which at the back ends coincides with the section of cylinders 22 and 23 and gradually decreases towards the front end, as is clearly shown in FIG. 6. The nozzle 7 is made of two parts: an inner part 37 and an outer part 38, the inner part 37 having a recess 39 which can receive a projection 40 provided in the body 17 for centering purposes. The inner part 37 is provided with lateral grooves, which, in cooperation with the outer part 38, form passages 34 and 35.

The driving mechanism 5 comprises a driving shaft 41 which goes through box 8 from one side to the other and projects at one end 42 out of the box 8, a gear wheel 43 being fixed to said end 42. An endless screw 44, mounted on supports 45 and 46, engages said gear wheel 43, said endless screw 44 being connected at one end to a wheel 47, which is connected by any suitable means such as a transmission belt (not shown) to an engine working continuously (not shown). The driving shaft 41 is thus imparted a continuous rotating movement.

On said shaft 41 having a zone 48 of a wider diameter are mounted: an asymmetrical fork 49; a ring 50; a cam 51 fixed to said shaft and having a lateral extension 52 with a serrated end, said serrated end engaging the serrated end of the extension 53 of another cam 54 freely mounted; a ring 55; nuts 56 screwed on a threaded zone of said shaft 41; and a second asymmetrical fork 57. Forks 49 and 57 have enlarged arms 60 and 61 having elongated windows 60a and 61a which allow a relative movement of arms 60 and 61 with respect to shaft 41, and shorter arms 58 and 59 guiding each other.

At their lower ends, arms 60 and 61 are provided with small wheels 62 and 63 running on the bottom of box 8. Fixed to the inner walls of arms 60 and 61 are two small shafts 64a—64b and 65a—65b having at their ends free rollers 66a—66b and 67a—67b, which run along the edges of cams 51 and 54 respectively. Rods 68 and 69 connect pistons 24 and 25 to forks 49 and 61 respectively.

Assuming that cams 49 and 57 are in the position shown in FIGS. 1, 9 and 11, the two injecting pistons will be in their extreme backward position and at the same level (see FIG. 1). As the shaft 41 turns in its continuous movement, it causes cams 51 and 54 to turn too in the same sense, as shown by the arrows (FIGS. 8 to 11). In their turning movement cams 51 and 54 press on rollers 66a and 67a respectively and, as long as portions AB and A'B' of cams 51 and 54 exert their pressure on rollers 66a and 67a, forks 49 and 57 are pressed forward and reach their extreme forward position when B and B' are in contact with rollers 66a and 67a (see FIGS. 8 and 10). As cams 51 and 54 continue to turn, their zones B—C and B'—C' maintain forks 49 and 57 in their extreme forward position by pressing on said rollers 66a and 67a. When rollers 66a and 67a run past points C and C', no pressure is exerted on them, whereas cams 51 and 54 then press on rollers 66b and 67b and, as long as portions AB and A'B' of cams 51 and 54 press on rollers 66b and 67b, forks 49 and 57 are pressed backward from the position shown in FIGS. 8 and 10 to the position shown in FIGS. 1, 9 and 11. Now, by virtue of the different shape of cams 51 and 54 (see FIG. 12) cam 51 starts pressing on roller 66a before cam 54 starts pressing on roller 67a, which means that fork 49, and, consequently, injecting piston 24, begin their forward movement before fork 57 and injecting piston 25 begin their own forward movement. As a result of this, at a certain movement during the forward movement of piston 24 the relative position of the two pistons is outphased as shown in FIG. 2. The granulated plastic material, which, through ducts 28 and 29 has poured down to cylinders 22 and 23, the said plastic being of a different colour but melting at the same temperature, on being pushed forward passes through the heated zone having the heating means 30 around it and is there fluidized. On the further progress forward of injecting pistons 24 and 25, the fluidized plastic material is forced through ducts 34 and 35, chamber 36 and into the mould where it becomes solid very quickly. The fluidized plastic first injected remains near the mouth of the mould and in the zone adjacent to the mould walls where it becomes solid. The fluidized plastic secondly injected passes through the center of the mould and occupies the zone opposite the mould mouth and the inner zone of the mould. The moulded flower piece comes out in two colours, one disposed around the mouth and the other at the ends of the mould. And a perfect two-coloured flower is obtained.

It is understood that the injecting action of injecting piston 25 must start during the injecting action of injecting piston 24, since the fluidized plastic must be injected into the mould in a continuous flow. The slightest interruption between injection of injecting pistons 24 and 25 would lead to a failure in the moulding operation.

It is also understood that the timed relation between the two injections can be adjusted by varying the relative position of cam 54 with respect to cam 51 within certain limits, i.e. as long as no interruption of the flow occurs between the two injections. A wide range of colour combinations can thus be obtained depending on the timed relation between the two injections and on the quantity of plastic injected each time. Said quantity can be graduated by any conventional means regulating the quantity of granulated plastic pouring down to the cylinders at each operation. The relative position of cams 51 and 54 can be adjusted by modifying the relative position of serrated lateral extensions 52 and 53 thereof.

During the injecting action of piston 25, the zone BC of cam 51 keeps on pressing on roller 66a so that the piston 24 remains in its extreme forward position. This is necessary to the good functioning of the apparatus since otherwise the injected fluidized plastic material might not go into the mould from chamber 35 but into passage 34.

It is obvious that simultaneous injection of the two colours can be obtained and a mixed colour piece can thus be obtained.

It is also obvious that injection in a timed relation without breaking the continuous flow of fluidized plastic material can be obtained by means of other apparatus, for example by means of two separate cylinders the injecting action of which is regulated in a suitable timed relation by any conventional means.

Having thus described the invention, what is claimed is:

1. Apparatus for forming many-coloured pieces of flowers in plastic material, comprising: a plurality of injection cylinders in a substantially parallel position each cylinder being provided with an injecting piston; means for feeding each injection cylinder with granulated plastic material melting substantially at the same temperature and being of different colour; means for causing the fluidization of said granulated thermoplastic material; one nozzle provided with converging passages and a front chamber, said converging passages connecting at their back ends with the forward ends of said injection cylinders and connecting at their forward ends with said front chamber; cam means for each injecting piston, each cam means being adapted to impart a forward movement, a retaining action and a subsequent backward movement to the corresponding piston, in such a spaced timed relation that the forward stroke of each piston but the first starts before the forward stroke of the preceding piston has ended, the shape of the cam means being such that they are adapted to keep the pistons in their forward position until the end of each moulding operation; a driving shaft adapted to cause simultaneously the turning of all said cam means, one of said cam means being stationary mounted on said driving shaft and having a lateral extension provided with a serrated end, the other cam means having a central hole and lateral extensions provided with a serrated end and being freely mounted on said shaft which passes through said central hole, the serrated ends of the cam means being adapted to engage the serrated ends of the lateral extension of the adjacent cam means, all cam means remaining stationary in the engaged position of the serrated ends on account of the said stationary cam means, said freely mounted cam means being adapted to turn around said driving shaft when the serrated means are out of engagement, thereby causing a change in the relative position of the cam means with respect to one another; and removable locking means adapted to keep in an engaged position the serrated ends of said cam means.

2. Apparatus for forming many-coloured pieces of flowers in plastic material, comprising: a plurality of injection cylinders in a substantially parallel position, each cylinder being provided with an injection piston; means for feeding each injection cylinder with granulated plastic material melting substantially at the same temperature and being of different colour; means for causing the fluidization of said granulated thermoplastic material; one nozzle comprising an outer part provided with means adapted to fix the nozzle to the injection cylinders, and an inner part having a plurality of grooves of a decreasing cross-section, said grooves being adapted to form, in cooperation with the said outer part, a corresponding number of passages, the front end of the said inner part being adapted to form, in cooperation with the said outer part, a front chamber, said front chamber being connected to the end of the said passages having a smaller cross-section, the end of each of the said passages having a bigger cross-section being connected to the end of an injection cylinder; cam means for each injecting pistons, each cam means being adapted to impart a forward movement, a retaining action and a subsequent backward movement to the corresponding piston, in such a spaced timed relation that the forward stroke of each piston but the first starts before the forward stroke of the preceding piston has ended, the shape of the cam means being such that they are adapted to keep the pistons in their forward position until the end of each moulding operation; a driving shaft adapted to cause simultaneously the turning of all said cam means, one of said cam means being stationary mounted on said driving shaft and having a lateral extension provided with a serrated end, the other cam means having a central hole and lateral extensions provided with a serrated end and being freely mounted on said shaft which passes through said central hole, the serrated ends of the cam means being adapted to engage the serrated ends of the lateral extension of the adjacent cam means, all cam means remaining stationary in the engaged position of the serrated ends on account of the said stationary cam means, said freely mounted cam means being adapted to turn around said driving shaft when the serrated means are out of engagement, thereby causing a change in the relative position of the cam means with respect to one another; and removable locking means adapted to keep in an engaged position the serrated ends of said cam means.

3. Apparatus for forming many colored pieces of flowers in plastic material, comprising a plurality of injection cylinders, each cylinder being provided with an injecting piston, means for feeding each injection cylinder with granulated plastic material melting substantially at the same temperature and being of different color, means for causing the fluidization of said granulated thermoplastic material, a single nozzle provided with converging passages and a front chamber, said converging passages connecting at their back ends with the forward ends of said injection cylinders and connecting at their forward ends with said front chamber, a plurality of operating means one for each injecting piston, each said operating means being adapted to impart a forward movement, a retaining action and a subsequent backward movement to the corresponding piston in such a spaced timed relation that the forward stroke of each piston, after the first piston has started, starts before the forward stroke of the preceding piston has ended, the operating means being so constructed and arranged to effect the retaining action so that each corresponding piston is retained in its forward position until all of said pistons have advanced to complete a moulding operation, a driving shaft adapted to cause simultaneously the operation of all said operating means, one of said operating means being fixedly mounted on said driving shaft and having engaging means, the other of said plurality of operating means each having a central hole embracing said shaft and including corresponding engaging means adapted to engage the engaging means of said one operating means in any of a multiplicity of angularly adjusted positions, whereby a change in the relative angularly adjusted position of the operating means with respect to one another can be accomplished, and locking means adapted to keep the engaging means of said operating means in adjusted engagement during use of the machine.

References Cited in the file of this patent

UNITED STATES PATENTS

| | | |
|---|---|---|
| 2,253,810 | Poux | Aug. 26, 1941 |
| 2,271,063 | De Mattia | Jan. 27, 1942 |
| 2,418,856 | Stacy | Apr. 15, 1947 |
| 2,620,922 | Deutsch | Dec. 9, 1952 |
| 2,679,600 | Bain | June 1, 1954 |
| 2,810,159 | Teichmann | Oct. 22, 1957 |